US012798226B2

(12) United States Patent
Soto Puente et al.

(10) Patent No.: US 12,798,226 B2
(45) Date of Patent: Nov. 17, 2026

(54) METHOD FOR BONDING A LAYER OF ELASTOMERIC MATERIAL TO AN ALUMINUM SUBSTRATE

(71) Applicants: SAFRAN AEROSYSTEMS, Plaisir (FR); CENTRE NATIONAL DE LA RECHERCHE SCIENTIFIQUE (CNRS), Paris (FR); UNIVERSITE DU MANS, Le Mans (FR)

(72) Inventors: Jorge Arturo Soto Puente, Moissy-Cramayel (FR); Fabienne Poncin-Epaillard, Paris (FR); Lazhar Benyahia, Le Mans (FR); Marisol Ji, Paris (FR); Valerie Briand, Moissy-Cramayel (FR)

(73) Assignees: SAFRAN AEROSYSTEMS, Plaisir (FR); CENTRE NATIONAL DE LA RECHERCHE SCIENTIFIQUE—CNRS, Paris (FR); UNIVERSITE DU MANS, Le Mans (FR)

( * ) Notice: Subject to any disclaimer, the term of this patent is extended or adjusted under 35 U.S.C. 154(b) by 57 days.

(21) Appl. No.: 18/869,426

(22) PCT Filed: Jun. 1, 2023

(86) PCT No.: PCT/FR2023/050765
§ 371 (c)(1),
(2) Date: Nov. 26, 2024

(87) PCT Pub. No.: WO2023/233108
PCT Pub. Date: Dec. 7, 2023

(65) Prior Publication Data

US 2025/0367917 A1 Dec. 4, 2025

(30) Foreign Application Priority Data

Jun. 2, 2022 (FR) ...................................... 2205333

(51) Int. Cl.
*B29C 65/00* (2006.01)
*B32B 15/06* (2006.01)
(Continued)

(52) U.S. Cl.
CPC .......... *B32B 38/0008* (2013.01); *B32B 15/06* (2013.01); *B32B 37/06* (2013.01);
(Continued)

(58) Field of Classification Search
CPC ............ B29C 65/01; B29C 1066/0012; B29C 1066/00143; B29C 1066/0242;
(Continued)

(56) References Cited

U.S. PATENT DOCUMENTS 10,934,458 B2 3/2021 Kinzelmann et al.
2017/0154866 A1 6/2017 Fathi et al.

OTHER PUBLICATIONS

Ji, et al., "Characterization of functionalized coatings prepared from pulsed plasma polymerization", Materials Chemistry and Physics, 2021, vol. 267, pp. 1-11 (11 pages).

*Primary Examiner* — Philip C Tucker
*Assistant Examiner* — Nickolas R Harm
(74) *Attorney, Agent, or Firm* — Sughrue Mion, PLLC

(57) ABSTRACT

A method for bonding a layer of elastomeric material to an aluminum substrate includes treating a surface of the aluminum substrate so as to roughen the surface of the aluminum substrate, treating the surface by an argon plasma, exposing the surface to a plasma, in the presence of a gaseous chemical precursor chosen from the epoxides, acrylics, alkenes, alkynes and imides, until a deposit of a chemical species with a thickness of between 5 nanometers and 110 nanometers is obtained, contacting the layer of elastomeric material with the surface of the aluminum
(Continued)

substrate, and vulcanizing the layer of elastomeric material. The exposing is carried out at a low pressure of between $10^{-2}$ mbar and $10^{-5}$ mbar.

11 Claims, 1 Drawing Sheet

(51) Int. Cl.

| | |
|---|---|
| ***B32B 37/06*** | (2006.01) |
| ***B32B 38/00*** | (2006.01) |
| ***B32B 38/10*** | (2006.01) |
| *B29C 65/10* | (2006.01) |

(52) U.S. Cl.
CPC .............. *B32B 38/10* (2013.01); *B29C 65/10* (2013.01); *B29C 66/0012* (2013.01); *B29C 66/00143* (2013.01); *B29C 66/0242* (2013.01); *B29C 66/026* (2013.01); *B29C 66/712* (2013.01); *B29C 66/7422* (2013.01); *B32B 2250/02* (2013.01); *B32B 2311/24* (2013.01)

(58) Field of Classification Search
CPC ........ B29C 1066/026; B29C 1066/712; B29C 1066/7422
See application file for complete search history.

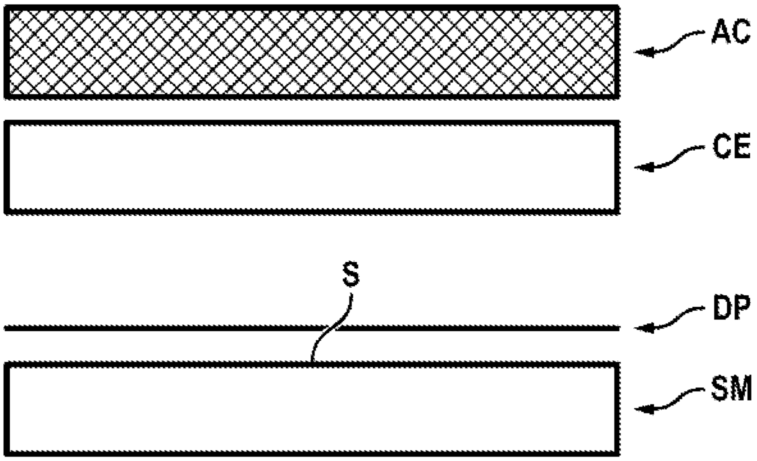
AC
CE
S
DP
SM

METHOD FOR BONDING A LAYER OF ELASTOMERIC MATERIAL TO AN ALUMINUM SUBSTRATE

CROSS-REFERENCE TO RELATED APPLICATIONS

This is a National Stage of International Application No. PCT/FR2023/050765 filed Jun. 1, 2023, claiming priority based on French Patent Application No. 2205333 filed Jun. 2, 2022, the contents of each of which being herein incorporated by reference in their entireties.

GENERAL TECHNICAL FIELD

The present invention relates to a method for bonding a layer of elastomeric material to an aluminum substrate.

It finds application in particular in the aeronautical field, for example in the manufacture of fuel tanks or defrosters.

STATE OF THE ART

In many industrial sectors, manufactured products are made from assemblies of materials including elastomers. In order to ensure their mechanical strength, the substrates on which the elastomers are deposited are covered with adhesion agents.

The need for high mechanical performance has led to an increase in the complexity of the methods for depositing these agents. Indeed, the deposition procedure is often manual, involves the repetitive application of one or more adhesive layers and depends on the complex geometries of the parts to be assembled.

Thus, in the aeronautical field, it is known to manufacture fuel tanks and defrosters from elastomer products for which gluing to metal, thermoplastic and vulcanized rubber substrates is necessary.

In the case of tanks, the latter integrate accessories of variable chemical natures which are assembled by gluing to the rest of the wall of the product. These gluings must therefore provide perfect sealing and significant mechanical resistance. Thus, for example, to satisfy a crash test, these tanks must maintain their sealing during a fall that occurs from a standard height of 15 meters. The adhesion between the accessories and the tank wall is therefore a key parameter for these assemblies.

Concerning defrosters, lesser mechanical constraints are being dealt with. On the other hand, these assemblies must withstand significant temperature variations during operation (defrosting cycles), which can range from −55° C. at altitude (in the absence of icing conditions) to temperatures of around 100° C. at the metallic thermal resistance assembled by bonding.

The constraints are induced by the differential expansions of the constituents (metal/rubber). These products, due to their use in an environment external to the aircraft, are subjected to aggressive environmental conditions (temperature variation, humidity, presence of ozone, abrasion, etc.).

Such assemblies are carried out so far in the following manner: surface preparation of the metal substrate (such as sandblasting, grinding, sanding), cleaning, deposition of an adhesion primer, deposition of a layer of glue and finally gluing with the elastomer layer.

These assemblies are integrated into the manufacture of the product (tank or defroster) which is then placed under vacuum and vulcanized in an autoclave.

The adhesive primer and glue layers are generally liquid phases (water-based or organic). As a result, operators are exposed to chemicals that can potentially be hazardous to health. In addition, the directives on risks related to chemicals are increasingly stringent and some adhesion products are already subject to obsolescence.

Thus, some adhesion primers use ethyl alcohol and ethyl acetate, both of which are highly flammable, with ethyl acetate also being an irritant.

A prior art of interest is constituted by document US2017/154866 and by the article "Characterization of functionalized coatings prepared from pulsed plasma polymerization" (JI Marisol et Al/2021).

A purpose of the present invention is to overcome the problem described above and to propose for this purpose a metal/elastomer assembly technique, in this case aluminum/elastomer, which is carried out via the preparation of the substrate by dry method, that is to say without using adhesion primers or glue at the metal/rubber interface.

PRESENTATION OF THE INVENTION

Thus, the present invention relates to a method for bonding a layer of elastomeric material to an aluminum substrate, characterized in that it comprises carrying out the following steps:

- a) Treating the surface of said aluminum substrate so as to roughen it;
- b Treating said surface by means of an argon plasma;
- c) Exposing said surface to a plasma, in the presence of a gaseous chemical precursor, said precursor being chosen from the epoxides, acrylics, alkenes, alkynes and imides, until a deposit of chemical species with a thickness of between 5 and 110 nanometers is obtained;
- d) placing said layer of elastomeric material (CE) in contact with the surface(S) of said aluminum substrate;
- e) Vulcanizing said layer of elastomeric material, said step c) being carried out at low pressure, i.e. under a pressure of between $10^{-2}$ and $10^{-5}$ mbar.

Thanks to the invention, the use of liquid adhesion chemicals used until now is eliminated.

In addition, unlike the prior art for which heterogeneities were observed in the preparation of the metal surface before bonding due to a manual method, the method according to the invention is simpler to implement, in particular due to the reduction in the number of steps and a saving in labor in the preparation of the metal surfaces.

Moreover, there is a homogeneity in the deposition of chemical species, both in composition and thickness, regardless of the geometry of the part.

In addition, thickness is gained with thinner deposits (5 to 100 nm) compared to 100 μm for prior art primers.

It should also be noted that steps b) and c) can be performed in masked time, since they do not require labor during plasma treatment.

Finally, this method helps to reduce the environmental footprint of this technique, in particular by reducing the use of chemical products that are contrary to current or future environmental standards and regulations.

According to other advantageous and non-limiting characteristics of the invention:

- in step a), said surface is treated until a roughness Ra of between 2 and 20 micrometers is obtained;
- in step a), said surface treatment is carried out by laser ablation or by mechanical treatment such as shot blasting, sanding or scraping;
- step c) is carried out with an argon plasma;

step c) is implemented with the following operating conditions:

Plasma in pulsed mode;

Power: comprised between 5 and 600 W, and preferably between 5 and 100 W;

Frequency: comprised between 5 and 50 KHz, and preferably between 5 and 30 KHz;

Argon gas flow rate: comprised between 5 and 50 $cm^3$/minute and preferably between 10 and 40 $cm^3$/minute;

Total duration: comprised between 11 and 60 minutes;

Duty cycle: between 4 and 30% for pulsed mode, and preferably between 8 and 11%.

DESCRIPTION OF FIGURES

Other characteristics and advantages of the invention will appear from the description which will now be given, with reference to the appended drawing, which represents, in an indicative but non limiting manner, a possible embodiment thereof.

On these drawings:

FIG. 1 is a very simplified diagram of an assembly obtained in accordance with the method according to the invention.

DETAILED DESCRIPTION OF THE INVENTION

As indicated above, the method according to the invention comprises carrying out the following steps:

a) Treating the surface of the aluminum substrate so as to roughen it;

b) Treating the substrate surface by means of an argon plasma;

c) Exposing the surface of the substrate to a plasma, in particular argon plasma, in the presence of a chemical precursor, said precursor being chosen from the epoxides, acrylics, alkenes, alkynes and imides, until a deposit of chemical species with a thickness of between 5 and 110 nanometers is obtained;

d) Contacting said layer of elastomeric material with the surface of the aluminum substrate;

e) Vulcanizing the layer of elastomeric material.

Each of these steps, as well as variations and/or preferred embodiments thereof are described below.

Treatment of the Surface of the Aluminum Substrate so as to Roughen it.

This treatment aims at preparing the free surface S of the metal substrate SM (see FIG. 1) in order to promote the subsequent anchoring of the layer of chemical species generated during the subsequent plasma treatment steps.

It also aims at removing the usual anti-corrosion protection layer from the surface of the metal substrate, such as the sulfuric anodic oxidation protection layer (abbreviated as "SAO").

Preferably, the surface is treated until a roughness Ra of between 2 and 20 micrometers is obtained.

To carry out this operation, laser ablation can be used or mechanical treatment can be used to create a rough surface such as shot blasting, sanding or scraping.

Treatment of the Surface of the Substrate by Means of an Argon Plasma

The main purpose of this treatment is to rid the surface S of the substrate SM of any oxides that may have formed thereon, and of any organic pollutant. Indeed, between the previous step and this one, a "re-oxidation" may have occurred.

Advantageously, this treatment can be implemented while respecting the following parameters:

Plasma in continuous mode;

Power: 200 W;

Argon gas flow rate: 20 $cm^3$/minute;

Duration: 20 minutes.

Exposure of said Surface to a Plasma, for Example Argon Plasma, in the Presence of a Chemical Precursor The precursor allows to create, by plasma deposition, a polymer layer which will allow to chemically compatibilize the metal surface with the elastomer.

The thickness of this layer must be sufficient to allow interdiffusion of the polymer.

According to the invention, said precursor is chosen from epoxy compounds, acrylic compounds, alkenes, alkynes and imides, until a deposit of chemical species with a thickness (referenced DP in FIG. 1) of between 5 and 110 nanometers is obtained.

For example, acetylene gas.

It should be noted that a thickness lower than that indicated above induces a mechanical resistance lower than that required. And this could also induce a poor covering of the metal.

Beyond 110 nanometers, no significant improvement in adhesion is detected and too thick a layer could cause internal stress embrittlement.

Advantageously, this step is implemented with the following operating conditions:

Plasma in pulsed mode;

Power: comprised between 5 and 600 W, and preferably between 5 and 100 W;

Frequency: comprised between 5 and 50 KHz, and preferably between 5 and 30 KHz;

Argon gas flow rate: comprised between 5 and 50 $cm^3$/minute and preferably between 10 and 40 $cm^3$/minute;

Total duration: from 11 to 60 minutes;

Duty cycle: between 4 and 30% for pulsed mode, and preferably between 8 and 11%.

These operating conditions promote the growth of the deposit DP, with interdiffusion between this deposit and the elastomer layer during the following step.

Contacting the Layer of Elastomeric Material with the Surface of the Aluminum Substrate The substrate SM is then used for assembly with an elastomer layer (referenced CE in FIG. 1) such as a PVC-NBR (mixture of polyvinyl chloride and butadiene-acrylonitrile).

If necessary, the face of the elastomer in contact will have been previously and advantageously subjected to a brightening treatment using a solvent in order to provide this face with "stickiness" before assembly. In other words, this operation not only cleans the face, but also swells the elastomer to promote diffusion/migration towards the deposit.

Use can also be made of elastomers such as polyurethane-based elastomers, EVA (ethylene vinyl acetate), etc.

Vulcanization of the Layer of Elastomeric Material

The assembly thus obtained is for example placed under vacuum and vulcanized. During this step, a chemical anchoring takes place which is obtained thanks to the reactivity of the plasma deposit DP with the elastomer to be vulcanized.

An alternative method is to vulcanize under pressure.

A thickness of material, such as an anti-crash AC material, can then be bonded to the surface opposite the elastomer layer CE.

This anti-crash material is generally a polyamide-based fabric with an elastomer coating. The coated face of this fabric is placed in contact with the brightened layer of elastomer CE manually. After this contact, the assembly is compressed using a notched roller.

Alternatively, one or more thicknesses of material reinforced with textile or other compositions/substrates may be used depending on the intended applications.

In the appended FIG. 1, the thicknesses shown do not reflect reality.

For purely indicative purposes, these thicknesses are as follows:

SM: less than 4 millimeters;

DP: between 5 and 110 nanometers;

CE: between 0.2 and 2 millimeters;

AC: between 0.1 and 10 millimeters.

Adhesion test specimens were assembled and vulcanized in an autoclave according to this method.

The adhesion values obtained as such are higher than those required by standard TSO-C80 (2 N/mm).

Concerning the stability of the metal/elastomer interface in contact with a fuel, an adhesion value greater than 1.08 N/mm after immersion in an isooctane/toluene mixture is observed.

The invention claimed is:

1. A method for bonding a layer of elastomeric material to an aluminum substrate, the method comprising:

treating a surface of the aluminum substrate so as to roughen the surface of the aluminum substrate;

treating the surface by an argon plasma;

exposing the surface to a plasma, in the presence of a gaseous chemical precursor chosen from epoxides, acrylics, alkenes, alkynes and imides, until a deposit of a chemical species with a thickness of between 5 nanometers and 110 nanometers is obtained;

contacting the layer of elastomeric material with the surface of the aluminum substrate; and vulcanizing the layer of elastomeric material, wherein said exposing is carried out at a low pressure of between $10^{-2}$ mbar and $10^{-5}$ mbar.

2. The method according to claim 1, wherein, in treating the surface of the aluminum substrate so as to roughen the surface, the surface is treated until a roughness Ra of between 2 micrometers and 20 micrometers is obtained.

3. The method according to claim 1, wherein treating the surface of the aluminum substrate so as to roughen the surface, said treating is carried out by laser ablation or by a mechanical treatment.

4. The method according to claim 3, wherein surface is treated so as to roughen the surface by the mechanical treatment, and wherein the mechanical treatment is shot blasting, sanding or scraping.

5. The method according to claim 1, wherein the exposing is carried out with an argon plasma.

6. The method according to claim 1, wherein said exposing is implemented by the plasma in a pulsed mode, having a power comprised between 5 W and 600 W, at a frequency comprised between 5 KHz and 50 KHz, with an argon gas flow rate comprised between 5 $cm^3$/minute and 50 $cm^3$/minute, for a total duration comprised between 11 min and 60 min, and with a duty cycle between 4% and 30% for the pulsed mode.

7. The method according to claim 6, wherein the power is between 5 W and 100 W.

8. The method according to claim 6, wherein the frequency is between 5 KHz and 30 KHz.

9. The method according to claim 6, wherein the argon gas flow rate is between 10 $cm^3$/minute and 40 $cm^3$/minute.

10. The method according to claim 6, wherein the duty cycle is between 8% and 11%.

11. The method according to claim 6, wherein the power is between 5 W and 100 W, the frequency is between 5 KHz and 30 KHz, the argon gas flow rate is between 10 $cm^3$/minute and 40 $cm^3$/minute, and the duty cycle is between 8% and 11%.

* * * * *